March 2, 1937. A. G. SLATER 2,072,225
MULTIPLE PURPOSE RUBBER ACCESSORY
Filed March 11, 1935   2 Sheets-Sheet 1
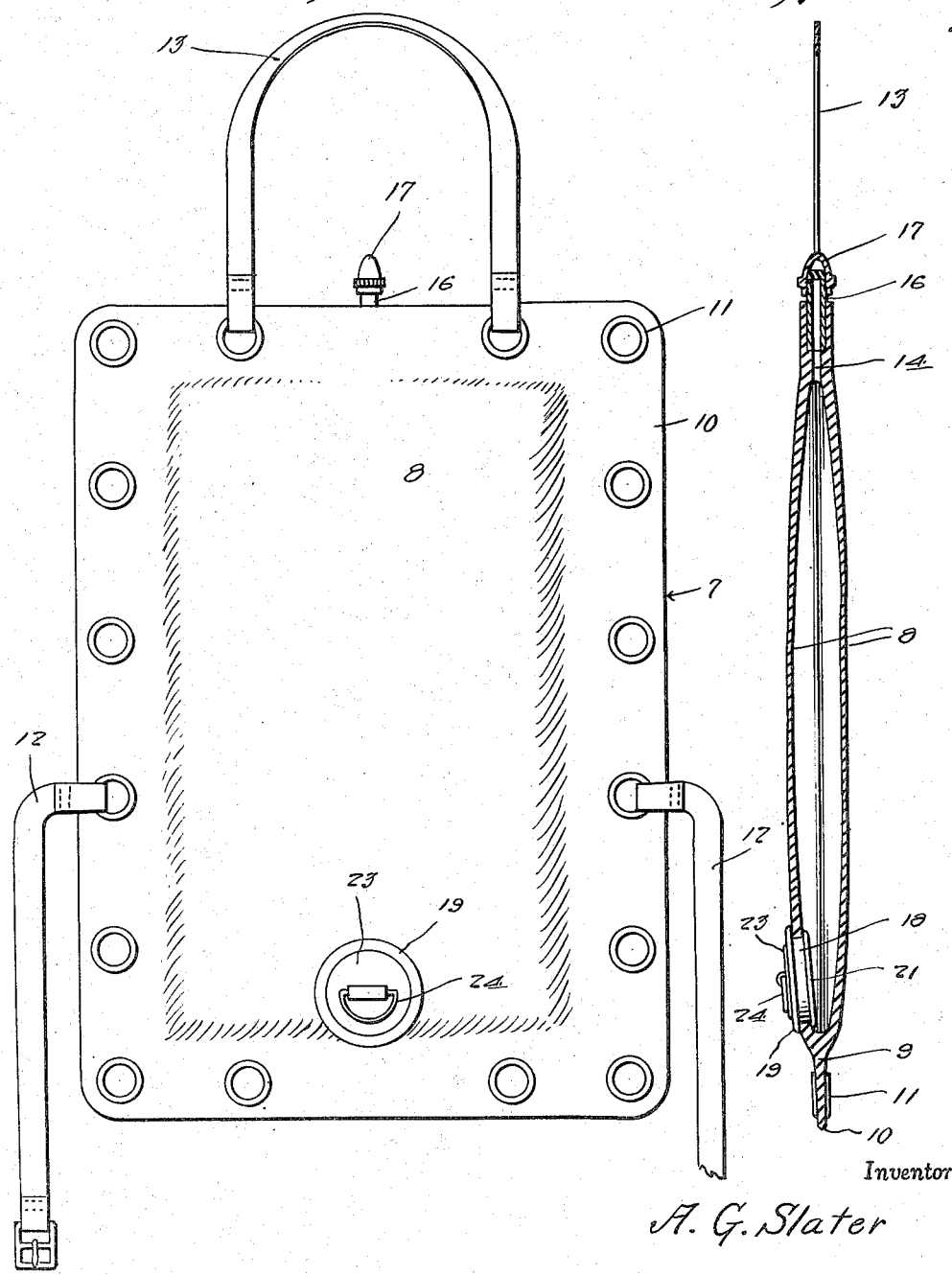
Inventor
A. G. Slater
By Clarence A. O'Brien
Attorney March 2, 1937.  A. G. SLATER  2,072,225
MULTIPLE PURPOSE RUBBER ACCESSORY
Filed March 11, 1935   2 Sheets-Sheet 2
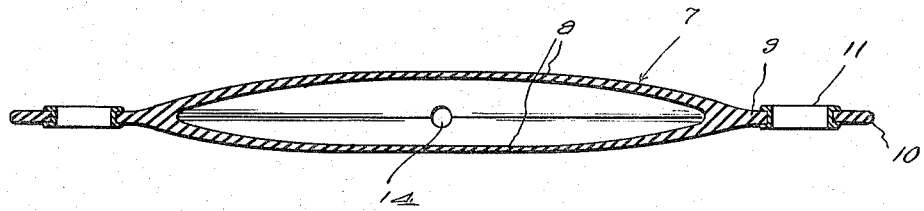
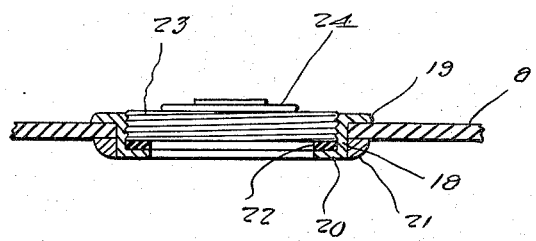
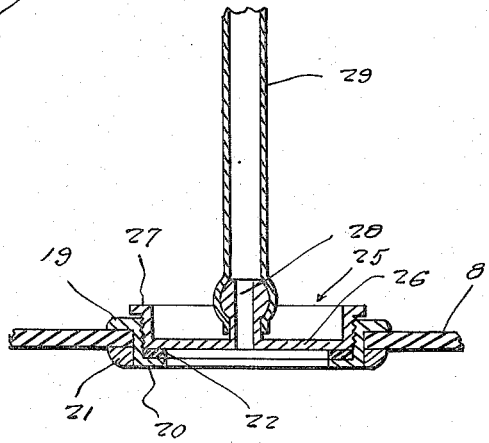
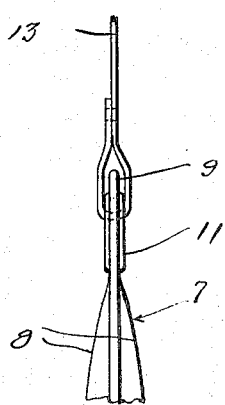
Inventor
A. G. Slater
By Clarence A. O'Brien
Attorney Patented Mar. 2, 1937

2,072,225

UNITED STATES PATENT OFFICE 2,072,225

MULTIPLE PURPOSE RUBBER ACCESSORY

Albert G. Slater, Miles City, Mont.

Application March 11, 1935, Serial No. 10,546

2 Claims. (Cl. 150—2.1)

This invention relates to a unique rubber article of a diversified type desirable for personal use and due to its inherent multiple purpose and combination features for in and out of doors use, and because of its general configuration and physical characteristics it may be classified as belonging to that field of invention embodying so-called hot and cold packs, syringes and expansible and contractible rubber bags.

Considering its structural characteristics, and a few of its merits, it might likewise be satisfactorily designated as a thoroughly practical, up-to-date rubber bag reflecting features and advantages such as enable it to be satisfactorily endorsed for domestic or sick room use, as well as for camping and other out of doors activities.

By way of introduction, and needless to say, I am conversant with the prior field of invention to which the present conception relates. Therefore, it will be evident as the description is weighed in conjunction with the accompanying illustrative drawings that my primary aim is to offer to the trade an innovation believed to be a specific improvement as contrasted with prior art devices in that it measures up to and answers the expected requirements and is, by way of comparison with similar devices, an improvement characterized by features and refinements of a specific, yet advantageous character.

The various uses and commercial aspects of the invention will be specifically referred to in the concluding portion of the description, prior to the claims.

In the accompanying pictorial drawings wherein like numerals are employed to designate like parts throughout the same:

Figure 1 is a plan view of the contrivance or accessory constructed in accordance with the principles of the present inventive conception.

Figure 2 is a central longitudinal sectional view depicting the structural features a little more in detail.

Figure 3 is a central cross sectional view showing the expansible and contractible portion of the container or bag inflated.

Figure 4 is a fragmentary edge elevational view showing the reinforced marginal flange.

Figure 5 is an enlarged detailed view illustrating the removable cap filler unit.

Figure 6 is a view similar to Figure 5 with the cap removed and illustrating a substitute adapter fixture to accommodate a hose.

The essential part of the structure is denoted, as a unit by the numeral 7. As a matter of structural convenience, this is designated as a rubber bag. Incidentally, the external surface of the rubber forming this bag may be properly abraded or otherwise finished as a feature of ornamentation enabling the device to be employed not only for home use but carried about somewhat in the nature of a pouch for street and other use. Although it is not essential, the article is substantially rectangular in top plan configuration. The bag is made from a single body of rubber and the body portion is defined by a pair of duplicate opposed expansible and contractible walls 8. In sectional configuration, it will be noticed that the central portions of the walls are comparatively thin and that these thinned portions merge into thickened portions which join the marginal flange 9. The flange itself is comparatively wide in relation to the rest of the bag and tapers from its point of juncture with the bag portion to the outer or perimeter edge 10. That is, it is gradually thinned so that the outer edge is of substantially flexible feather-edge formation. This sort of a flange is calculated to lend to the article the requisite features of conformation to render it properly compensating and adjustable to the various uses to which it will be put. Imbedded in openings or apertures at equi-distant points in the flange, I provide reinforcing eyelets 11. In practice, these eyelets may be used purely for ornamentation and reinforcing purposes. Then again they serve equally well in a utilitarian capacity to accommodate one or more straps, such as for example, straps of the type denoted at 12. This enables the bag to be conveniently strapped around the waist or other portions of the anatomy of the wearer. Then, too, the bag may be provided with a neck strap 13 of proper dimensions attachable to the eyes at one end so that the bag could be hung around the neck of the wearer. The purposes of these features will be later described.

Next I call attention to an air inlet passage of a restricted type denoted at 14 in Figure 2. At this particular point, the flange is socketed to accommodate a molded-in tube. This tube may be of metal or hard rubber and it is denoted as at 16. A part of the tube protrudes beyond the marginal edge of the flange and the end of this part is preferably threaded to accommodate a finger removable cap 17. This tube can be used as an injector to feed air into the bag by the mouth or by a suitable pump or other inflationary device (not shown). It is important to note that the restricted passage 14 being in the rubber itself can be pressed between the fingers of the user for the desired valving action when the device is used as a douche bag or syringe. That is to say, this provides the requisite finger control action.

Inasmuch as the device is adapted to contain water or ice so that it may be used either as a cold or hot pack I provide a filler device. This as shown in Figure 5, comprises first an annulus 18 which is fitted in an opening in the rubber adjacent the reinforced end portion thereof as illustrated in Figure 1. This has an outside flange 19 and an inwardly projecting ledge forming flange 20. The annulus is maintained in place by a retention ring 21 and the ledge carries a packing ring or equivalent element 22. This serves to provide a water tight connection when the screw cap 23 is threaded into place. The cap is of disk-like form and provided with an external finger grip or handle 24. This same structure is usable to accommodate the unique adapter unit 25 shown in Figure 6. This is in the form of a cap 26, said cap having a threaded rim to thread into the annulus and an external flange 27 to function as a finger grip. At its center the cap carries an outwardly projecting headed attaching neck 28 which may be used to accommodate a hose or the like 29. This arrangement is used when the device is used for a shower bath, for an internal body water bath, or for a douche operation.

Considering the description of the construction in conjunction with the drawings and the preceding commercial advantages, it is believed that a clear understanding of the invention will be had. There are of course other advantages which could be mentioned but it is believed that presentation as now given is complete and comprehensive.

It is to be understood that although the drawings illustrate the preferred embodiment of construction and arrangement of details, changes in shape, size, rearrangement and proportions may be resorted to in actual practice, so long as they do not depart from the spirit of the accompanying claims now made.

Having thus described the invention, what is claimed as new is:

1. A bag of the class described comprising a resilient body composed of a pair of comparatively thin walls and a marginal flange having a thickened inner portion joined to the walls, with the flange gradually decreasing in thickness outwardly from said thickened portion, a plurality of spaced eyelets passing through the flange and spaced inwardly from the outer edge thereof, said flange being of considerable width, with the eyelets spaced outwardly from the thickened portion thereof in a row, said row extending entirely around the flange, and said eyelets being of sufficient diameter to receive straps.

2. An article of the class described comprising a bag of resilient material and including a marginal flange of considerable width, a portion of the flange having a passage therein extending from its outer edge through its inner edge, a tube having a portion fitting in the outer part of the passage, with its inner end spaced outwardly a considerable distance from the inner end of the passage, whereby the inner part of the passage can be closed by pressure upon that portion of the flange through which said inner portion of the passage extends, said tube projecting from the outer edge of the flange, and a closure cap threaded on the outer end of the tube.

ALBERT G. SLATER.